United States Patent [19]
Fujii et al.

[11] Patent Number: 5,656,228
[45] Date of Patent: Aug. 12, 1997

[54] INJECTION MOLDING METHOD

[75] Inventors: Masaki Fujii; Shinjiro Saihara; Toyotsugu Itoh, all of Hachioji, Japan

[73] Assignee: Konica Corporation, Tokyo, Japan

[21] Appl. No.: 490,838

[22] Filed: Jun. 15, 1995

[30]   Foreign Application Priority Data

Jun. 21, 1994   [JP]   Japan ................... 6-138881

[51] Int. Cl.$^6$ ................................ B29C 45/57
[52] U.S. Cl. ................ 264/328.13; 264/328.16
[58] Field of Search ............... 264/328.13, 328.16, 264/328.1, 40.1, 40.5; 425/145, 149

[56]          References Cited

U.S. PATENT DOCUMENTS

| | | | |
|---|---|---|---|
| 3,840,312 | 10/1974 | Paulson et al. | 264/328.13 |
| 4,797,236 | 1/1989 | Kojima | 264/328.13 |
| 4,836,960 | 6/1989 | Spector et al. | 264/328.16 |
| 4,882,117 | 11/1989 | Takeda et al. | 264/328.16 |
| 4,986,938 | 1/1991 | Izuka et al. | 264/328.13 |
| 5,093,049 | 3/1992 | Uehara et al. | 264/328.16 |
| 5,108,689 | 4/1992 | Uehara et al. | 264/328.13 |
| 5,219,512 | 6/1993 | Tsutsumi | 264/328.13 |

FOREIGN PATENT DOCUMENTS

| | | |
|---|---|---|
| 57-95431 | 6/1982 | Japan . |
| 61-227012 | 10/1986 | Japan ........................ 264/328.13 |
| 62-11619 | 1/1987 | Japan . |
| 3-39224 | 2/1991 | Japan . |
| 3-132323 | 6/1991 | Japan . |
| 4-25425 | 1/1992 | Japan . |

*Primary Examiner*—Jill L. Heitbrink
*Attorney, Agent, or Firm*—Frishauf, Holtz, Goodman, Langer & Chick, P.C.

[57]              ABSTRACT

In an injection molding method, a resin is injected into a cavity of a mold in such a manner that a pressure ratio of a cavity surface pressure in the cavity to a cylinder pressure of an injection molding device is not less than 0.65, a first pressure keeping process to keep the cylinder pressure at a constant is conducted after the filling step, the cylinder pressure is increased so that the cavity surface pressure in the cavity is 0.95 times or more larger than the pressure at the time that the cavity has been filled with the resin; and a second pressure keeping process to keep the changed increased pressure at least until a cavity surface temperature becomes lower than a glass transition temperature of the resin.

6 Claims, 2 Drawing Sheets

INJECTION MOLDING METHOD

BACKGROUND OF THE INVENTION

The present invention relates to an injection molding method preferably applied to manufacture a resin product such as a plastic lens which is strictly required to have a high precision in figure dimension, a high evenness in internal quality and have not any internal distortion.

Up to now, as a conventional metallic mold to mold a transparent component with a relatively large thickness without the internal distortion or a shrink mark by the injection molding, the metallic mold disclosed by Japanese Patent Open to Public inspection Publication No. (J.P OPI Publication No.) 95431/1982 has been very well known. In the metallic mold, a high temperature heating medium and a low temperature heating medium are selectively changed so as to flow into a flow passage of the metallic mold and the flow amount can be controlled by a flow amount regulating valve so that the temperature of the metallic mold can be changed in accordance with a presetting program.

Further, as an injection molding method of producing a high precision plastic lens or a plastic lens which has not any internal distortion and is superior in optical performance, the following methods have been disclosed by J.P OPI Publication No. 11619/1987, 39224/1991 and 132323/1991.

In a method, a metallic mold is heated higher than a glass transition temperature of a resin, a melted resin is introduced into a cavity of the heated metallic mold, a keeping pressure of 400 to 1200 Kgf/cm$^2$ is applied for 0.1 to 20 seconds, and then, after the gate is mechanically sealed, the metallic mold is gradually cooled.

In another method, the cavity forming surface of a metallic mold is heated up to a temperature at which a resin flows, the cavity is filled with the melted resin, and then the metallic mold is cooled.

Still further, as a manufacturing method for injection molding products whose strength is not lowered by a weld line, a method in which a metal surface temperature of a metallic mold at a position on which a weld line is generated is set within a range of a thermal deforming temperature to a flow-stopping temperature and a non-crystallized resin is introduced into a cavity of the metallic mold has been well known by J.P OPI Publication No. 25425/1992.

Even if the metallic mold disclosed in J.P OPI Publication No. 95431/1982 was used, there has been the following problems. That is, it may be not easy to determine through experiences the presetting program for the metallic mold temperature capable of attaining the object for each kind of resin material. Further, even if the metallic mold temperature is controlled in accordance with the same program, if the resin melting temperature or the cylinder pressure in the molding machine is changed, the object is not necessarily attained, resulting in that a shrink mark, a warp, or an internal distortion may take place on a molding product or the undesired projections (flash ridge) become so large to produce a molding product which need additional process in the finishing process.

Further, the method disclosed in J.P OPI Publication Nos. 39224/1991 and 132323/1991 is the substantially same method as the method disclosed in J.P OPI Publication No. 95431/1982 in which the metallic mold temperature is heated in advance to a temperature at which the resin can flow. Therefore, depending on the resin melting temperature or the cylinder pressure in the molding machine, the method is apt to cause the following problems. A shrink mark, a warp, or an internal distortion may take place on a molding product or the undesired projections become so large to produce a molding product which need additional process in the finishing process.

Still further, the method disclosed in J.P OPI Publication No. 25425/1992 is a method using a metallic mold whose cavity surface temperature on a specific portion is heated to a temperature at which a resin is softened, the similar problems as those mentioned above in the method disclosed J.P OPI Publication Nos. 39224/1991 and 132323/1991.

Since the method disclosed in J.P OPI Publication No. 11619/1987 is a method sealing a gate by filling the cavity with a melted resin and by applying a keeping pressure, if a high keeping pressure was not applied, a shrink mark is apt to take place. In order to apply the high keeping pressure, the metallic mold needs the precision and the strength more. In the result, the method is apt to make the metallic mold large in size or high in cost.

SUMMARY OF THE INVENTION

The present invention has been made in order to eliminate the problems mentioned above in the conventional methods. The object of the present invention is to provide an injection molding method capable of producing stably a superior resin product such as a optical device component with high precision in figure dimension, high evenness in internal quality and no internal distortion even if the kind of resin is changed.

The present invention attained the above object with the following structure.

On a condition that the pressure ratio of a cavity surface pressure in a cavity of a metallic mold when a resin is filled in the cavity to a cylinder pressure of an injection molding device is larger than 0.65, the filling process to fill the resin into the cavity is conducted, and then the first pressure keeping process to keep the cylinder pressure at a constant. Thereafter, the cylinder pressure is increased so that the cavity surface pressure in the cavity is 0.95 times or more larger than the pressure (the filled pressure) at the time that the cavity has been filled with the resin and the ratio of the cavity surface pressure in the cavity to the cylinder pressure is larger than 0.5, and the second pressure keeping process to keep the increased cylinder pressure is conducted at least until the cavity surface temperature becomes lower than the glass transition temperature of the resin.

In the injection molding method of the present invention, since the filling process to fill the resin into the cavity is conducted in such the manner that the pressure ratio of the cavity surface pressure in a cavity of a metallic mold when a resin is filled in the cavity to the cylinder pressure of an injection molding device is larger than 0.65 and thereafter the first pressure keeping process is conducted, the generation of a weld line can be prevented and the evenness in internal quality can be enhanced. Thereafter, since the cylinder pressure is regulated in such the manner that the cavity surface pressure in the cavity is 0.95 times or more larger than the pressure at the time that the cavity has been filled with the resin and the ratio of the cavity surface pressure in the cavity to the cylinder pressure is larger than 0.5, and the second pressure keeping process to keep the regulated cylinder pressure is conducted at least until the cavity surface temperature becomes lower than the glass transition temperature of the resin, the generation of a shrink mark, a warp or an internal distortion can be prevented and the precision in figure dimension can be enhanced. In the result, an optical device component such as a plastic lens superior in optical performance can be produced. Further, even if a kind of the resin is changed, a molding product with even quality, non internal distortion and high precision in figure dimension can be produced.

Incidentally, the filling process to fill the resin into the cavity in such the manner the ratio of the cavity surface pressure at the time that the cavity is filled with the resin to the cylinder pressure to provide a resin filling pressure is larger than 0.65 can be conducted easily by the following ways that the cavity surface temperature of the metallic mold is heated by a heat source provided inside or outside the metallic mold to a proper temperature within a range that is higher than the glass transition termperature of the resin and lower than the melted resin temperature in the cylinder of the injection molding device, thereafter the resin is fed at a proper plunger speed from the cylinder to the cavity. In succession, the first pressure keeping process is also easily conducted by the way that the plunger is substantially stopped. Further, the second pressure keeping process can be easily conducted by the manner that the plunger is gradually moved in accordance with the cylinder pressure indicated on the oil pressure gauge of the hydraulic oil pressure pump to push the plunger of the cylinder and the cavity surface pressure in the cavity measured by the pressure sensor which is provided so as to form a part of the cavity surface, and then the plunger is stopped when the cavity surface temperature measured by a temperature sensor which is also provided so as to form a part of the cavity surface becomes lower than the glass transition temperature of the resin.

DETAILED DESCRIPTION OF THE PREFERRED EMBODIMENT

Hereinafter, the present invention will be further explained on the basis of the example shown in drawings.

Figure 1:
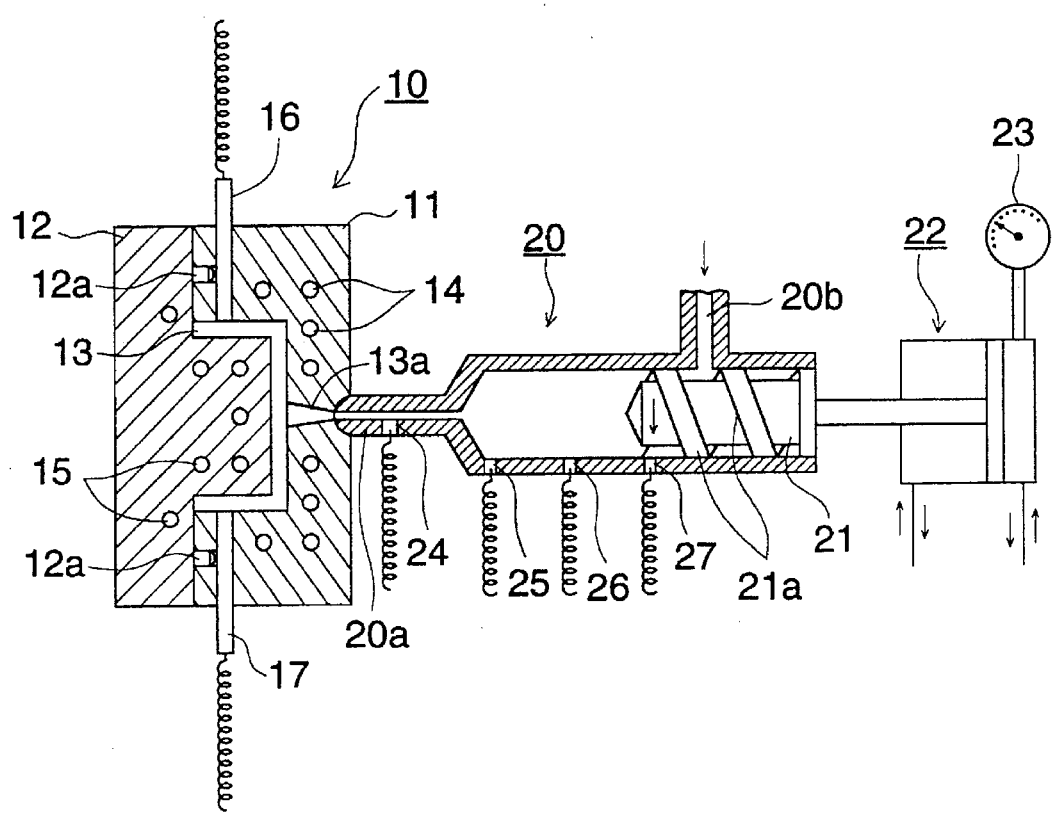
FIG. 1 is an outlined structural view showing an example of an apparatus to conduct an injection molding method of the present invention.
Figure 2:
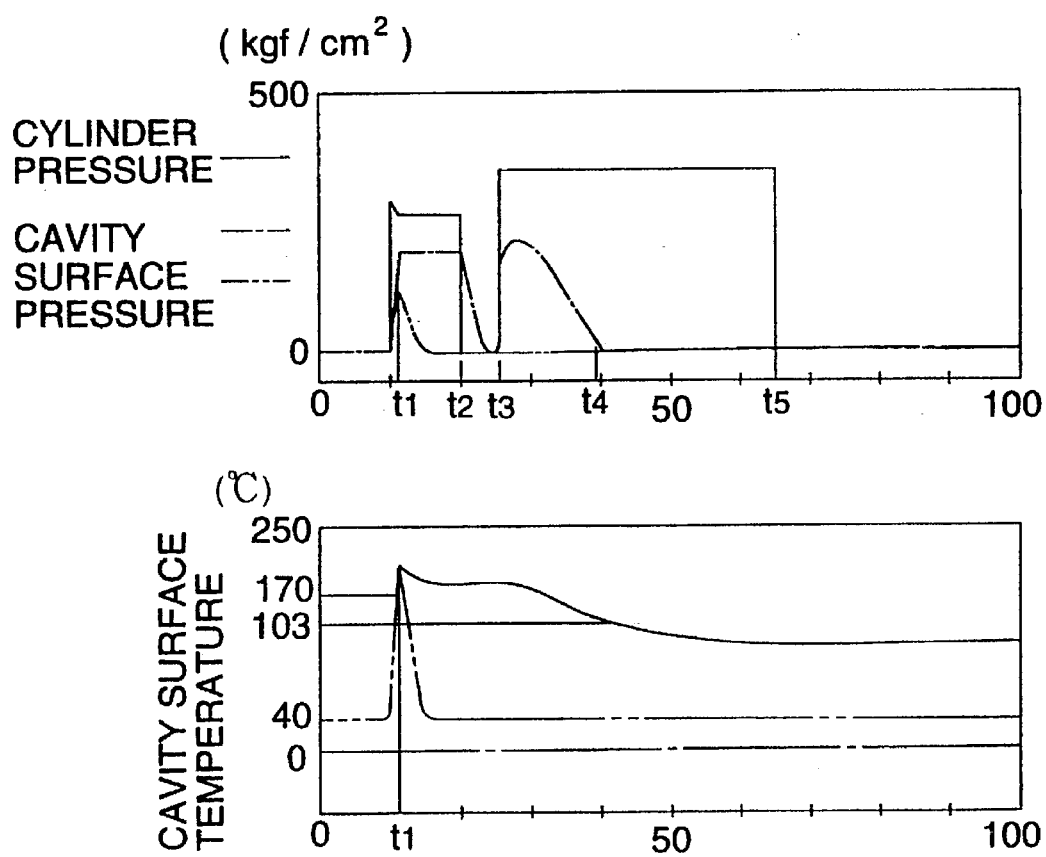
FIG. 2 is a time sequential graph showing a cylinder pressure of a injection molding device in the injection molding, a cavity surface pressure of a metallic mold, and a cavity surface temperature.
Figure 3:
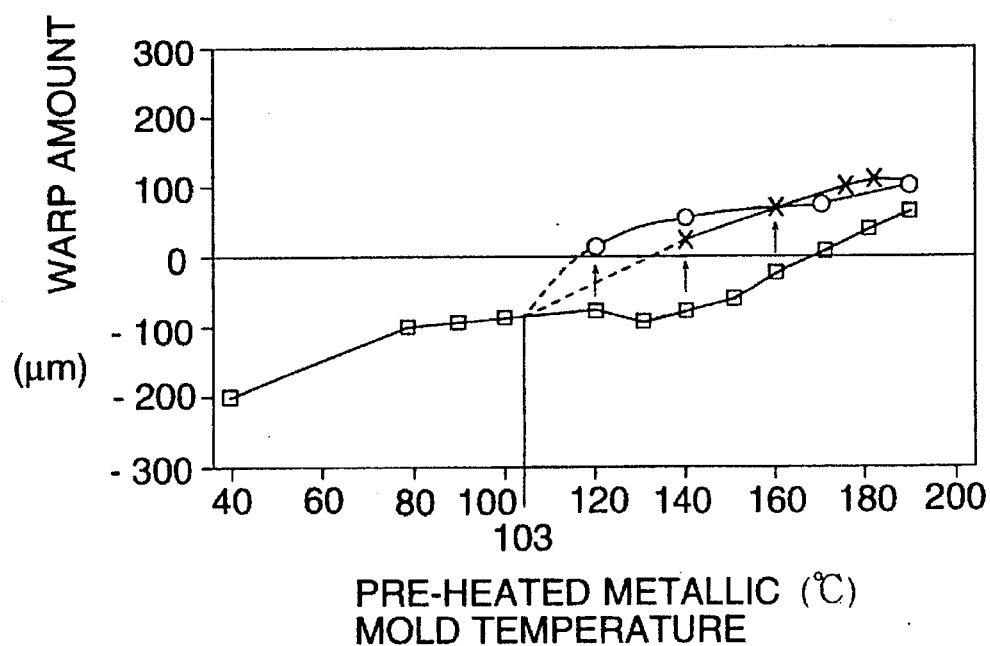
FIG. 3 is a graph showing a relation between an injection molding condition and a molding product.

FIG. 1 is an outlined structural view showing an example of an apparatus to conduct an injection molding method of the present invention. FIG. 2 is a time sequential graph showing a cylinder pressure of a injection molding device in the injection molding, a cavity surface pressure of a metallic mold, and a cavity surface temperature. FIG. 3 is a graph showing a relation between an injection molding condition and a molding product.

In FIG. 1, numeral 10 is a metallic mold for injection molding in which a box-shaped cavity is formed by a combination of a fixed metallic mold and a detachable metallic mold. The detachable metallic mold is engaged with a positioning pin 12a on the fixed metallic mold. Numerals 14 and 15 each is a seethe heater or a heating-liquid flowing-passage acting as a heat source in the metallic mold to heat the fixed metallic mold or the detachable metallic mold. Numeral 16 is a pressure sensor such as a crystal type to detect a resin pressure in the cavity 13. Numeral 17 is a temperature sensor such as a thermo-couple type to detect a neighboring cavity surface temperature or a resin surface temperature in the cavity 13.

Further, numeral 20 is a cylinder of the injection molding device which comprises a nozzle 20a engaging with an inlet of a spool 13a of a resin passage to the cavity 13 in the fixed metallic mold and a resin receiving port 20b. Numeral 21 is a plunger comprising a resin feeding screw 21a. Numeral 22 is a hydraulic oil pressure device to move forwardly or backwardly the plunger 21. Numeral 23 is a pressure gauge indicating a cylinder pressure. Numerals 24, 25, 26, 27 are temperature sensors such as a thermo-couple type to detect the resin temperature at an inside of the nozzle, and an exit side, a middle point, and an inner side of the cylinder 20.

Into the cylinder 20, a melted resin is fed through the resin receiving port 20b. A resin conveying screw 21a is rotated in an arrow mark direction by a non-illustrated rotating means which engages with a gear through a slidable key. Then, the resin conveying screw 21a conveys the melted resin into a leftward direction so that the plunger 21 fills up the melted resin into the cylinder 20. In this time, the plunger 21 which is also rotated in the arrow mark direction together with the resin conveying screw 21a is moved in a rightward direction by the reaction caused by the melted resin conveyed in the leftward direction and takes a predetermined position illustrated in the drawing. In the result, the melted resin is filled up to the predetermined position corresponding to a predetermined volume of the cylinder 20.

It is preferable that a cylinder wall of the cylinder 20 can be heated by a non-illustrated heater whose generating heat amount can be controlled in accordance with detected information by the temperature sensors 24 through 27 so that a temperature of the filled-up melted resin can be controlled. In this case, it is permissible that a solid resin is fed through the resin receiving port 20b and is melted in the cylinder 20. However, the feeding of the melted resin is prefer to the feeding of the solid resin, because the feeding of the melted resin can make it possible that a time period from the filling-up of the resin into the cylinder 20 to the starting of the injection molding by the leftward movement of the plunger 21 by the hydraulic oil pressure device 22 is made shorter.

As mentioned above, after the melted resin of the predetermined temperature has been filled up in the cylinder 20, the injection molding device starts the injection molding by moving the plunger 21 in a leftward direction with the hydraulic oil pressure device 22. After the cavity 13 has been filled with the injected resin, if a pressure ratio of a cavity surface pressure or a filling pressure in the cavity 13 detected by the pressure sensor 16 to a cylinder pressure indicated on the pressure gauge 23 is not larger than 0.65, a weld line or an internal distortion may be generated, further, it may be difficult to prevent a shrink mark from taking place on a molding product. Accordingly, it is necessary to make the pressure ratio not less than 0.65. The pressure ratio condition can be attained by the following procedure.

Namely, when a temperature of the metallic mold 10 is low in the time of starting the injection molding, the melted resin injected into the metallic mold is cooled rapidly, then a viscosity of the injected resin becomes high. As a result, a weld line and an internal distortion are generated in the resin filled in the cavity 13. Further, a filling resin pressure in the cavity 13 detected by the pressure sensor 16 becomes low and, on the other hand, a cylinder pressure indicated on the pressure gauge 23 becomes high, resulting in that the pressure ratio of the resin filling pressure to the cylinder pressure becomes smaller than 0.65. Then, if the metallic mold 10 is heated in advance by the heat sources 14 and 15 in the metallic mold 10 so as to make a cavity surface temperature detected by the temperature sensor 17 higher than a glass transition temperature of the resin and the injection molding is started for the heated metallic mold, the melted resin is filled up into the cavity 13 without being cooled so much. As a result, a weld line and an internal distortion are not generated, and a pressure ratio of a cavity surface pressure detected by the pressure sensor 16 at the time that the filling-up process for the cavity 13 has been completed is kept not less than 0.65. Incidentally, if the pressure ratio becomes higher than 0.8, undesired projections made of the injected resin may take place easily. As a result, the metallic mold 10 is required to have a high precision in order to prevent the undesired projection, or an additional work to remove the undesired projection is required in the finishing process of the product. Consequently, it is preferable to make the pressure ratio not higher than 0.8.

After the melted resin has been filled up in the cavity 13, a first pressure keeping process is conducted for a short period in which the cylinder pressure at the time that the filling process has been completed is kept at the same level. In the result, the shrink mark on the molding product can be prevented, and the undesired projection is also prevented. If the first pressure keeping process is not conducted, the shrink mark may be generated easily. If an excessively high cavity surface pressure is applied so as to avoid the shrink mark, the undesired projection may become bigger. In order to avoid the undesired projection formed under the excessively high cavity pressure, the metallic mold is required to have a high precision and a larger strength, resulting in that the cost for the metallic mold may be increased appreciably.

After the first pressure keeping process, the cylinder pressure is increased so that the cavity surface pressure detected by the pressure sensor 16 is made 0.95 times or more higher than the cavity surface pressure at the time that the filling process for the cavity has been completed and the pressure ratio of the cavity surface pressure to the cylinder pressure is made not less than 0.5. A second pressure keeping process to keep the cylinder pressure at the same level is conducted at least until the cavity surface temperature detected by the temperature sensor 17 become lower than the glass transition temperature of the resin. With this process, a box-shaped product having no shrink mark and no warp can be obtained. In contrast, if the cavity surface pressure detected by the pressure sensor 16 when the cylinder pressure is increased to a pressure of the second pressure keeping process is smaller than a pressure which is 0.95 times larger than the cavity surface pressure at the time that the filling process for the cavity 13 has been completed, or if the pressure ratio of the cavity surface pressure detected by the pressure sensor 16 to the cylinder pressure is smaller than 0.5, the shrink mark and the warp are apt to take place. Further, if the second pressure keeping process is finished before the cavity surface temperature become lower than the glass transfer point, the similar problems may occur.

Incidentally, if the cavity surface pressure detected by the pressure sensor 16 when the cylinder pressure is increased to the pressure of the second pressure keeping process is larger than a pressure which is 1.2 times larger than the cavity surface pressure at the time that the filling process for the cavity 13 has been completed, or if the pressure ratio of the cavity surface pressure detected by the pressure sensor 16 to the cylinder pressure is larger than 0.6, the undesired projection may become bigger, resulting in that an additional work is needed to finish the product. Accordingly, it is preferable to make the cavity surface pressure detected by the pressure sensor 16 in the time of the second pressure keeping process smaller than a pressure which is 1.2 times larger than the cavity surface pressure at the time that the filling process for the cavity 13 has been completed, and, it is also preferable to make the pressure ratio of the cavity surface pressure detected by the pressure sensor 16 to the cylinder pressure smaller than 0.6.

FIG. 2 is a graph obtained in the case that polystyrene whose glass transition temperature is 103° C. is used to the injection molding. In the pressure graph, a cylinder pressure indicated with a solid line and a cavity surface pressure indicated with a one-doted chain line represent an inventive example of the present invention in which the metallic mold 10 is heated to 170° C. in advance. On the other hand, a cavity surface pressure indicated with a two-doted chain line represents a comparative example in which the metallic mold 10 is heated to 40° C. in advance. Incidentally, a cylinder pressure in the comparative example is omitted, because it changes similarly with the change pattern of the cylinder pressure indicated with the solid line until t2 at which the first pressure keeping process is finished. In the temperature graph, the cavity surface temperature indicated with a solid line represents the inventive example of the present invention, and while the cavity surface temperature indicated with a two-doted line represent the comparative example.

It can be seen from FIG. 2, when the melted polystyrene whose temperature is 210° C. is injected from the cylinder to the metallic mold whose temperature is 40° C. which is lower than the glass transition temperature 103° C. of the polystyrene, the pressure ratio of the filling pressure of the resin when the filling process has been completed to the cylinder pressure is lower than 0.44, and is much lower than 0.65. Accordingly, even if a pressure keeping process is conducted for 10 seconds in which the cylinder pressure when the filling process has been completed is kept, a cavity surface pressure to eliminate a shrink mark can not be kept during such the short pressure keeping process. Further, the cavity surface temperature is raised to the temperature of the melted resin at the time that the filling process is finished, thereafter, it is cooled down rapidly even under the pressure keeping process. In the result, a shrink mark and a warp which are external defects in terms on an external figure and a weld line and an internal distortion which are internal defects are generated on the molding products.

In contrast, when the metallic mold is heated in advance to a temperature of 170° C. which is sufficiently higher than the glass transition temperature 103° C. of polystyrene and the melted polystyrene whose temperature is 210° C. is injected from the cylinder to the heated metallic mold, the pressure ratio of the filled pressure of the resin when the filling process has been completed to the cylinder pressure is higher than 0.74 which is higher than 0.65. In the result, the weld line is not generated. Further, when a first pressure keeping process to keep the cylinder pressure at the time that the filling process has been completed for 10 seconds is conducted, the cavity surface pressure at the time that the filling process has been completed can be kept, and the cavity surface temperature which is raised to the temperature of the melted resin at the time that the filling process has been finished is rarely lowered. In the result, the generation of the shrink mark can be avoided. Still further, the second pressure keeping process is conducted in such a manner that the cavity surface pressure is made 0.95 times or more larger in order to surely avoid the shrink mark, preferably 1.2 times smaller in order to avoid the undesired projection than that at the time that the filling process has been finished. During the second keeping process, the cavity surface pressure is 0.5 times larger than the cylinder pressure, and the raised cylinder pressure is maintained until the cavity surface temperature become lower than 103° C. which is the glass transition temperature of polystyrene. In the result, the undesired projection become very few so that an additional work is not required in the finishing process, a product which has not the internal defects of the weld line and the internal distortion and the figure defects of the shrink mark and the warp can be obtained.

FIG. 3 shows a molding test result in which a box is produced from polystyrene whose glass transition temperature is 103° C. by the injection molding with an apparatus as shown in FIG. 1. The figure dimensions of the box are 40×100×30 mm in length×width×height, and each of the bottom plate and the side walls of the box has the thickness of 3 mm. In the injection molding, the temperature of the melted resin in the cylinder is 210° C., the cylinder pressure during the first pressure keeping process after the filling process for the cavity has been completed is set at 300 kgf/cm² regardless the filling pressure in the cavity, and the cylinder pressure is kept for 10 seconds. In the second pressure keeping process conducted in succession to the first pressure keeping process, the cylinder pressure is set at 400 kgf/cm² and the cylinder pressure is kept for 20 seconds.

In FIG. 3, the square mark indicates a change in the warp amount on the transverse side wall of the box produced in such a test condition that the pre-heated metallic mold temperature is changed in the above injection molding condition. The circle mark also indicates the change in the warp amount in the case that the cylinder pressure in the second pressure keeping process in the above injection molding condition is changed to 600 kgf/cm². Further, the x mark indicates the change in the warp amount in the case that the keeping time in the second pressure keeping process is changed to 40 seconds.

The test result shown in FIG. 3 is summarizes as follows. In the case that the pre-heated metallic mold temperature is lower than 103° C. of the glass transition temperature of polystyrene, even if the cylinder pressure in the second pressure keeping process is increased to 1.5 times larger or the keeping times in the second pressure keeping process is made 2.0 times longer, the warp is still generated in the similar manner. Therefore, it is difficult to avoid the generation of the warp. In the case that the pre-heated metallic mold temperature is higher than 103° C., the maximum warp amount in an inward direction on the transverse side wall is reduced to lower than 100 μm on the condition that the pressure of 400 kgf/cm² is applied for 20 seconds in the second pressure keeping process after the first pressure keeping. Further, if the cylinder pressure in the second pressure keeping process is increased to 1.5 times larger or the keeping times in the second pressure keeping process is made 2.0 times longer, the warp amount can be reduced appreciably in comparison with the condition before the cylinder pressure in the second pressure keeping process is changed. In other words, since the warp amount and the warp direction can be regulated with the change in the condition of the second pressure keeping process, it is preferable that the pre-heated metallic mold temperature is made higher than the glass transition temperature of the currently used resin (103° C. in the above polystyrene case).

In the case that the pre-heated metallic mold temperature is set within a range of 103° C. to 210° C., the cavity surface pressure detected by the pressure sensor 16 at the time of the filling process for the cavity becomes 300 kgf/cm² whose pressure ratio is larger than 0.65 and falls within a preferable range lower than 0.8, resulting in that any weld line is not generated and also any shrink is not generated. Incidentally, if the pre-heated metallic mold temperature is raised higher than the melted resin temperature in the cylinder, since heating or cooling process needs a relatively longer time, a large amount of energy is not only lost, but also undesired projections are generated so much and the metallic mold so warps that the shrink mark is readily generated. Consequently, it is preferable that the pre-heated metallic mold temperature is set within a range of 103° C. to 210° C. In this case, if the second keeping pressure of 400 Kgf/cm² is applied suddenly in succession to the first keeping pressure of 300 Kgf/cm², the cavity surface pressure detected by the pressure sensor 16 exceeds over 1.2 times of a pressure at the time that the filling process has been completed. In the result, the undesired projections may be generated so much. In order to prevent the generation of the undesired projection, it is preferable to provide a releasing time for releasing the keeping pressure between the first pressure keeping process and the second pressure keeping process as shown in the example of FIG. 2, or to reduce the pressure in the second pressure keeping process.

The present invention, of course, is not limited to the example of polystyrene, and can be applied to a well-known resin capable of being used to the injection molding.

According to the technique of the present invention, a surprising effects that the superior resin products such as optical components with high precision in dimension, high internal even quality, no-internal distortion can be produced stably by the use of the resin capable of being used in the injection molding.

What is claimed is:

1. An injection molding method, comprising filling a resin into a fixed volume cavity of a mold in such a manner that a pressure ratio of a cavity surface pressure in the cavity to a cylinder pressure of an injection molding device is not less than 0.65 at the time when the filling process is completed; thereafter conducting a first pressure keeping process so as to keep the cylinder pressure at the pressure when the filling process was completed; thereafter changing the cylinder pressure so that the cavity surface pressure in the cavity is 0.95 times or more of the cavity surface pressure at the time that the cavity was filled with the resin; and conducting a second pressure keeping process to keep the changed cylinder pressure at least until a cavity surface temperature becomes lower than a glass transition temperature of the resin.

2. The method of claim 1, wherein, during the first pressure keeping process, the cavity surface pressure in the cavity is not larger than 0.8 times the cylinder pressure.

3. The method of claim 1, wherein, during the second pressure keeping process, the ratio of the cavity surface pressure in the cavity to the cylinder pressure is larger than 0.5.

4. The method of claim 1, wherein, during the second pressure keeping process, the cavity surface pressure is not larger than 1.2 times the cavity surface pressure at the time that the cavity has been filled with the resin.

5. The method of claim 1, wherein a cavity surface temperature of the mold is heated to a temperature within a range that is higher than the glass transfer point of the resin and lower than a melted resin temperature in the cylinder in advance to the filling step.

6. The method of claim 1, wherein when the cylinder pressure in the second pressure keeping process is made higher than the cylinder pressure in the first pressure keeping process, the cylinder pressure is reduced for a short time period before the cylinder pressure is increased to the cylinder pressure in the second pressure keeping process.

* * * * *